United States Patent [19]

Boettcher et al.

[11] 3,723,581

[45] Mar. 27, 1973

[54] METHOD OF PRODUCING FUEL AND/OR BREEDER ELEMENTS FOR NUCLEAR REACTORS

[75] Inventors: Alfred Boettcher, Aachen; Hubertus Nickel, Julich, both of Germany

[73] Assignee: Kernforschungsanlage Julich Gesellschaft mit beschrankter Haftung, Julich, Germany

[22] Filed: Apr. 18, 1969

[21] Appl. No.: 817,553

[52] U.S. Cl..............264/0.5, 252/301.1 R, 176/88, 176/89, 176/68
[51] Int. Cl. ..............................................G21c 21/00
[58] Field of Search.....264/0.5; 252/301.1 R; 176/89

[56] References Cited

UNITED STATES PATENTS

| | | | |
|---|---|---|---|
| 3,310,611 | 3/1967 | Zocher | 264/0.5 |
| 3,342,910 | 9/1967 | Ishihara et al. | 264/0.5 |
| 3,344,080 | 9/1967 | Livey et al. | 264/0.5 X |
| 3,463,702 | 8/1969 | D'Eye et al. | 264/0.5 X |
| 3,488,409 | 1/1970 | Beutler et al. | 264/0.5 |

*Primary Examiner*—Carl D. Quarforth
*Assistant Examiner*—P. A. Nelson
*Attorney*—Francis D. Stephens and Hugo Huettig, Jr.

[57] ABSTRACT

Coated particles used in making fuel and/or breeder elements are mixed with carbides and then heat hardened to form a compound member.

4 Claims, No Drawings

METHOD OF PRODUCING FUEL AND/OR BREEDER ELEMENTS FOR NUCLEAR REACTORS

This invention relates to a method for the production of fuel and/or breeder elements for nuclear reactors in which the fuel and/or breeder element contains particles coated with pyrolytical carbon or carbides, such as silicium carbide, zirconium carbide or the like and/or oxides such as beryllium oxide, aluminum oxide, zirconium oxide or the like. Such oxide or carbide coatings practically prevent the escape of gaseous or solid products of fission even at high temperatures when there is some loss due to burning. The diameter of the coated particles amounts, in general, to several hundred $\mu$, and preferably from 500 to 1000 $\mu$.

Fuel and/or breeder elements containing fuel and/or breeder material in the form of coated particles are used in different types of construction. In one method for forming fuel and/or breeder elements, the coated particles are covered with a binding mixture of graphite and then pressed at a temperature from about 60° to 180° C. Approximately 30 percent of the total volume is taken up by the coated particles. The density of the combined or compound particles so formed amounts to about 2 g/cm³. The use of a covering or casing of graphite is absolutely necessary for the fuel and/or breeder elements.

As disclosed in German Patent No. 1,241,541, a casing made of steel or a zirconium alloy containing the coated fuel and/or breeder particles has been used as the fuel element because of the high burn-out that is achieved. It is not advisable to form the coated particles into compound particles while using a pure graphite binding mixture within the metallic casing because it is possible that the graphite in the compound member will react with the metal casing at the temperatures arising in the reactor. When such fuel and/or breeder elements are used in water-cooled reactors, the risk of damaging the fuel and/or breeder elements because of penetrating water is substantially increased because of the graphite binding agent.

Efforts have been made to achieve a high degree of heat conductivity by mixing uranium carbide particles, either partially or entirely coated with graphite, with powdery silicon carbide or silicon and to harden the particles under high pressure, in which the pressure in a hot pressing process lies between 200 and 700 kp/cm², and during cold pressing between 2,100 and 4,200 kp/cm². Following this, the hardened compound particles were submerged in molten silicium at a temperature ranging between 1760° C and about 2000° C as disclosed in U.S. Pat. No. 3,129,141. However, in this method, it was only possible to produce fuel elements in which the fuel particles were suspended in a matrix of silicon and silicon carbide. Since the fuel particles are not encased by a gas impermeable layer, the fission products in this compound member could hardly be prevented from escaping.

It is the object of this invention to produce a method for the production of fuel and/or breeder elements by a more simple technique for obtaining a fuel and/or breeder element which will sufficiently meet the various requirements of quite different types of reactors, to produce elements which have an especially high heat conductivity, and to prevent the escape of fission products so that the elements are usable over a long period of time.

In general, these objects are obtained from the surprising discovery that coated particles wetted with furfural alcohol and mixed with a finely ground powder of silicon, silicon carbide or zirconium carbides form a compound member having a particle diameter up to approximately 100 $\mu$ and which member has a high specific heat conductivity when the amount of admixed powder lies between 10 and 20 percent of the weight. It has been found in this case that the heat conductivity of the mixture lies by one factor up to 10 and more above the value measured heretofore for the loose weight of coated particles.

It is, of course, known that furfural alcohol with traces of concentrated mineral acid spontaneously forms solid condensation products to complete resinification. However, furfural alcohol is unsuited as a binding agent since the bridges of synthetic material formed by the resinification would be again destroyed by the coking produced by the high temperatures generally prevailing in nuclear reactors. It is known that silicon and silicon carbide have a high heat conductivity at room temperatures. However, it was not known nor expected that the heat conductivity of a compound member made with silicon, silicon carbide and/or zirconium carbide would exceed the heat conductivity of the loose weight of coated particles to the extent mentioned above. Another unexpected discovery is in that the compound members produced from the aforesaid mixtures are stable at the temperatures generally prevailing in nuclear reactors not only with regard to the materials used for the metallic casing but also with regard to casings or coatings made of graphite. Likewise they have been found to be just as stable with regard to water.

In this invention, fuel and/or breeder elements are produced by a method in such a way that the coated particles while admixed with a conventional hydrocarbon compound and/or hydrogen silicide compound are mixed with powdered carbides and/or metal forming carbides of high heat conductivity, and that the loose mixture, after being pressed without damaging the coatings, is heat treated into a compound member. In this case, it is sufficient to press the mixture which has been filed into a cylindrical tube or casing to some extent by hand. In a preferred form of the method, the coated particles are wetted with furfural alcohol and then mixed with powdered silicon, silicon carbide and/or zirconium carbide; the furfural alcohol is then resinified and, following this, the compound member is then sintered. In order to obtain a compound member having a density that is as high as possible, it has been found desirable to admix the coated particles with a powdered silicon carbide and/or zirconium carbide having a particle size smaller than 30 $\mu$. In doing so, the density of the fuel and/or breeder element is approximately 4 g/cm³.

If the compound member is to have a certain porosity as, for example, for use in gas-cooled reactors, then it is appropriate that the powdered material admixed with the coated particles has a particle size which lies above 50 $\mu$.

In order to resinify furfural alcohol for producing a compound member from the coated particles admixed with the powdered material, it is preferred that HCl gas be passed through the mixture.

A further advantageous variation of this invention is in that diphenyl dichlorsilane or even a well-known chlorine containing allysilane compound or a vinyl silane compound is mixed with the furfural alcohol so that the amount of this component is up to a percent of the weight. The mixture of the coated particles with silicon, silicon carbide and/or zirconium carbide is thereafter heat hardened at a temperature of about 40° to 50° C. Alternatively, the hardening of coated particles wetted with furfural alcohol and admixed with an allysilane compound containing chlorine, or a vinyl silane compound, is achieved by heating them in a protective gas stream such as an argon stream or in a vacuum at a temperature ranging from about 200° to 250° C for such time that the products of disintegration formed are removed.

After the compound member has been formed from the coated particles and powdered components by the resinification of the furfural alcohol, in a further step the compound member is sintered and preferably at a temperature above 1000° C in an argon stream. Alternatively it is possible to place the compound member formed by the resinification of the furfural alcohol into a nuclear reactor and to permanently harden the member by the temperatures prevailing in the nuclear reactor or by the emission of fission products. In this case, the sintering process of heating the fuel and/or breeder element is accomplished by the splitting of the nucleus in the reactor. This is especially significant when it is necessary that the compound member is encased in a metal jacket and thus to produce the compound member within the casing of the fuel and/or breeder element itself. It has been found that the possible shrinkage during sintering is minimal. It also has been found to be quite effective to surround the compound member with a thin layer of silicon carbide or other suitable material and then, after sintering, to place the compound member into a casing or jacket.

Fuel elements produced according to this invention and when a metal jacket is used have a high compatibility of the compound member with the metallic jacket or even with graphite when this is used as a jacket. A considerable advantage of the fuel and/or breeder elements of this invention is in that they have such high stability and hardness that a casing or jacket is not necessary. Also these fuel and/or breeder elements have a high heat conductivity. Another advantage is in that the elements do not react with steam. Therefore the fuel and/or breeder elements produced by the method of this invention can be used in water-cooled reactors in the same manner as in metal or gas-cooled reactors. It has also been found that the elements produced by the method of this invention have a high resistance to rays.

The following are examples of this invention:

EXAMPLE 1

In producing a cylindrical fuel element, coated particles were moistened with 5 percent by weight of furfural alcohol. These moistened particles were then mixed with 10 percent by weight of the moistened particles of powdered silicon carbide. This mixture was put in a glass tube and slightly pressed by hand. The furfural alcohol was resinified with HCl gas. The solid stable compound member thus formed was forced out of the glass and was sintered for several hours, that is up to 10 hours, in an argon gas stream at a temperature of 1200° C. The heat conductivity of the compound member thus formed was fifteen times that of a loose filling of coated particles of the same composition.

EXAMPLE 2

A compound member was prepared which was especially suitable for being placed in a graphite tube. The solidification was accomplished by a type of inner polycondensation of the furfural alcohol. Small amounts of diphenyl dichlorsilane were mixed with the furfural alcohol before the coated particles were moistened by the alcohol. The amount of diphenyl dichlorsilane used was less than 1 percent of the furfural alcohol to which it was mixed. After the particles were wetted with the aforesaid furfural alcohol and additive and mixed with powdered silicon carbide, the compound member solidification was obtained by heating the material to about from 40° to 50° C. The green compound member which was thus obtained was placed in a graphite tube and the tube then sintered at a temperature of 1200° C. The density of the compound member was approximately 4 g/cm$^3$ and had a maximum porosity of 20 percent. As compared with a loosely filled particle mixture in a graphite tube, the heat conductivity of the compound member produced by this example was increased fifteen times.

Having now described the means by which the objects of this invention are obtained,

We claim:

1. In a method for producing nuclear fuel or breeder element containing particles coated with a substance selected from the group consisting of pyrolytic carbon, carbides, silicon carbide, and zirconium oxide, and filling said particles into a casting, the improvement comprising wetting the coated particles with furfural alcohol containing up to 1 percent by weight of a material selected from the group consisting of chlorine containing allysilane and vinyl silane, heat treating said mixture at a temperature from about 40° to 50° C, mixing the wetted particles with a powder selected from the group consisting of silicon, silicon carbide, and zirconium carbide, resinifying the furfural alcohol to form a compound member, and then sintering the compound member.

2. A method as in claim 1 in which said furfural alcohol mixed with chlorine containing allysilane or vinyl silane is heated in a vacuum or in a protective gas stream at a temperature from about 200° to 250° C until products of disintegration are removed.

3. A method as in claim 2, wherein sintering the compound member of resinified furfural alcohol is in a stream of argon gas at a temperature above 1000° C.

4. A method as in claim 2, wherein sintering the compound member of resinified furfural alcohol is in a nuclear reactor at the temperatures prevailing therein.

* * * * *